United States Patent
Denton et al.

(10) Patent No.: US 8,306,037 B2
(45) Date of Patent: *Nov. 6, 2012

(54) MULTI-PROTOCOL NETWORKING PROCESSOR WITH DATA TRAFFIC SUPPORT SPANNING LOCAL, REGIONAL AND WIDE AREA NETWORKS

(75) Inventors: I. Claude Denton, Beaverton, OR (US); James L. Gimlett, Tigard, OR (US)

(73) Assignee: Null Networks LLC, Las Vegas, NV (US)

( * ) Notice: Subject to any disclaimer, the term of this patent is extended or adjusted under 35 U.S.C. 154(b) by 1941 days.

This patent is subject to a terminal disclaimer.

(21) Appl. No.: 11/343,387

(22) Filed: Jan. 30, 2006

(65) Prior Publication Data

US 2006/0133411 A1    Jun. 22, 2006

Related U.S. Application Data

(63) Continuation of application No. 09/860,207, filed on May 18, 2001, now Pat. No. 7,002,967.

(51) Int. Cl.
*H04L 12/28* (2006.01)
*H04L 12/56* (2006.01)

(52) U.S. Cl. ............................ 370/395.5; 370/419

(58) Field of Classification Search ............ 370/395.5, 370/395.51, 401, 469, 389, 419, 465
See application file for complete search history.

(56) References Cited

U.S. PATENT DOCUMENTS

| | | |
|---|---|---|
| 5,040,170 A | 8/1991 | Upp et al. |
| 5,058,110 A | 10/1991 | Beach et al. |
| 5,572,515 A | 11/1996 | Williamson et al. |
| 5,621,383 A | 4/1997 | Yoshiyama |
| 5,742,765 A | 4/1998 | Wong et al. |
| 5,838,924 A | 11/1998 | Anderson et al. |
| 5,841,760 A | 11/1998 | Martin et al. |
| 5,907,682 A | 5/1999 | Miyazawa |
| 6,006,318 A | 12/1999 | Hansen et al. |
| 6,034,947 A | 3/2000 | Yoshida et al. |
| 6,041,066 A | 3/2000 | Meki et al. |
| 6,075,788 A | 6/2000 | Vogel |

(Continued)

OTHER PUBLICATIONS

Applied Micro Circuits Corporation, "Ganges: STS-192 POS/ATM SONET/SDH Mapper", Advanced Summary Data Sheet, Jun. 2000, 2 pages.*

(Continued)

*Primary Examiner* — Michael Thier
*Assistant Examiner* — Feben M Haile
(74) *Attorney, Agent, or Firm* — Schwabe, Williamson & Wyatt, P.C.

(57) ABSTRACT

A networking processor is formed with selected ones of one or more system interfaces, one or more network/intermediate interfaces, a plurality of data link sub-layer control/processing blocks, and a plurality of physical sub-layer coders/decoders and processing units. The elements are provisioned in a combinatorially selectable manner, enabling the single networking processor to be able to selectively facilitate data trafficking in accordance with a selected one of a plurality of protocols. The protocols include at least one each a datacom and a telecom protocol. Accordingly, the network processor supports data traffics spanning local, regional and wide area networks. In one embodiment, the traffic data may be framed or streaming data being transmitted/received in accordance with a selected one of a plurality frame based protocols and a plurality of variants of a synchronous protocol. The frame based protocols may also be frame based protocols encapsulated with the synchronous protocol.

40 Claims, 8 Drawing Sheets

U.S. PATENT DOCUMENTS

| | | | |
|---|---|---|---|
| 6,118,785 | A | 9/2000 | Araujo et al. |
| 6,188,692 | B1 | 2/2001 | Huscroft et al. |
| 6,226,680 | B1 | 5/2001 | Boucher et al. |
| 6,301,229 | B1 | 10/2001 | Araujo et al. |
| 6,347,344 | B1 | 2/2002 | Baker et al. |
| 6,400,730 | B1 | 6/2002 | Latif et al. |
| 6,556,593 | B1 | 4/2003 | Herkersdorf et al. |
| 6,580,731 | B1 | 6/2003 | Denton |
| 6,650,638 | B1 * | 11/2003 | Walker et al. ............... 370/389 |
| 6,690,682 | B1 | 2/2004 | Giaretta et al. |
| 6,839,871 | B2 | 1/2005 | Patel et al. |
| 6,944,168 | B2 | 9/2005 | Paatela et al. |
| 6,961,348 | B2 * | 11/2005 | Yu ............................ 370/466 |
| 7,002,967 | B2 | 2/2006 | Denton et al. |
| 7,075,953 | B2 | 7/2006 | Keller |
| 7,274,706 | B1 | 9/2007 | Nguyen et al. |
| 7,328,270 | B1 | 2/2008 | Reents et al. |
| 7,385,965 | B2 | 6/2008 | McCormick et al. |
| 7,463,656 | B2 | 12/2008 | Denton |
| 2002/0009100 | A1 | 1/2002 | Raghavan |
| 2002/0122386 | A1 | 9/2002 | Calvignac et al. |
| 2003/0110197 | A1 | 6/2003 | Hansen et al. |
| 2003/0110339 | A1 | 6/2003 | Calvignac et al. |
| 2003/0193962 | A1 | 10/2003 | Primrose et al. |
| 2004/0024938 | A1 * | 2/2004 | Bian et al. .................... 710/260 |
| 2004/0057390 | A1 | 3/2004 | Boleyn et al. |
| 2004/0131090 | A1 | 7/2004 | Clauberg |
| 2005/0238028 | A1 | 10/2005 | Keller |
| 2006/0212780 | A1 | 9/2006 | Ohira et al. |
| 2007/0008965 | A1 | 1/2007 | Keller |
| 2007/0047554 | A1 | 3/2007 | Denton |

OTHER PUBLICATIONS

Hari et al., "A Reliable and Scalable Striping Protocol", Conference Proceedings on Applications, Technologies, Architectures, and Protocols for Computer Communications, pp. 131-141, Oct. 1996.

Hari et al., An Architecture for Packet-Striping Protocols, ACM Transactions on Computer Systems, vol. 17, No. 4, pp. 249-287, Nov. 1999.

Hutchins et al., "A Novel Approach to Mobility Management", ACM SIGCOMM Computer Communications Review, vol. 29, Iss. 1, pp. 89-96, Nov. 1999.

Iren et al., "The Transport Layer: Tutorial and Survey", ACM Computing Surveys, vol. 31, No. 4, pp. 360-405, Dec. 1999.

Trajkovic et al., "Effect of Traffic Knowledge on the Efficiency of Admission-Control Policies", ACM SIGCOMM Computer Communications Review, vol. 29, Iss. 1, pp. 5-34, Jan. 1999.

Walker et al., "64b/66b Coding Update", IEEE 802.3ae, Mar. 2000.

Weinmiller et al., "Performance Study of Access Control in Wireless LANs—IEE 802.11 DFWMAC and ETSI RES 10 Hiperlan", Mobile Networks and Applications, vol. 2, Iss. 1, pp. 55-67, Jun. 1997.

Office Action, issued in U.S. Appl. No. 09/860,207, mailed Jan. 25, 2005.

Notice of Allowance, issued in U.S. Appl. No. 09/860,207, mailed Aug. 30, 2005.

Applied Micro Circuits Corporation, "Khatanga: 10 Gigabit Ethernet MAC and PHY / OC-192c POS Framer and Mapper," Advanced Product Brief, Apr. 2001, 3 pages.

* cited by examiner

US 8,306,037 B2

MULTI-PROTOCOL NETWORKING PROCESSOR WITH DATA TRAFFIC SUPPORT SPANNING LOCAL, REGIONAL AND WIDE AREA NETWORKS

CROSS-REFERENCE TO RELATED APPLICATIONS

The present application is a continuation of U.S. application Ser. No. 09/860,207, filed May 18, 2001, now issued as U.S. Pat. No. 7,002,967.

BACKGROUND OF THE INVENTION

1. Field of the Invention

The present invention relates to the field of networking. More specifically, the present invention relates to protocol processing for high speed data traffic routing, such as 10 Gigabit Ethernet and IP packet switching, spanning local, regional and wide area networks.

2. Background Information

With advances in integrated circuit, microprocessor, networking and communication technologies, an increasing number of devices, in particular, digital computing devices, are being networked together. Devices are often first coupled to a local area network, such as an Ethernet based office/home network. In turn, the local area networks are interconnected together through wide area networks, such as SONET networks, ATM networks, Frame Relays, and the like. Of particular importance is the TCP/IP based global inter-network, the Internet. Historically, data communication protocols specified the requirements of local/regional area networks, whereas telecommunication protocols specified the requirements of the regional/wide area networks. The rapid growth of the Internet has fueled a convergence of data communication (datacom) and telecommunication (telecom) protocols and requirements. It is increasingly important that data traffic be carried efficiently across local, regional, as well as wide area networks.

As a result of this trend of increased connectivity, an increasing number of applications that are network dependent are being deployed. Examples of these network dependent applications include but are not limited to, the world wide web, email, Internet based telephony, and various types of e-commerce and enterprise applications. The success of many content/service providers as well as commerce sites depend on high speed delivery of a large volume of data across wide areas. As a result, high speed data trafficking devices, such as high speed optical, or optical-electro routers, switches and so forth, are needed.

Unfortunately, because of the multiplicity of protocols, including datacom and telecom protocols, that may be employed to traffic data in the various types of networks, designers and developers of networking components and equipments, such as line cards, routers, switchers and so forth, have to wrestle with a multitude of prior art protocol processors, each typically dedicated to the support of either local/regional or regional/wide area protocols, in their design of these components/equipments. This burden is costly, and slows down the advancement of high speed networks.

Accordingly, a need exists for a highly flexible multi-protocol processor capable of supporting high-speed data traffic in local, regional, and wide area networks.

SUMMARY OF THE INVENTION

A networking processor is formed with selected ones of one or more system interfaces, one or more network/intermediate interfaces, a plurality of data link sub-layer control/processing blocks, and a plurality of physical sub-layer coders/decoders and processing units. The elements are provisioned in a combinatorially selectable manner, enabling the single networking processor to be able to selectively facilitate data trafficking in accordance with a selected one of a plurality of protocols. The protocols include at least one each of a datacom and a telecom protocol, enabling the network processor to provide data traffic support spanning local, regional and wide area networks.

In one embodiment, the traffic data may be framed or streaming data being transmitted/received in accordance with a selected one of a plurality of frame based protocols and a plurality of variants of a synchronous protocol. The frame based protocols may also be frame based protocols encapsulated with the synchronous protocol.

In one embodiment, the frame based protocols include 10 Gigabit Ethernet protocols and the Packet over SONET protocol. The plurality of variants of a synchronous protocol include the streaming and packet modes of the SONET protocol. Further, the 10 Gigabit Ethernet protocols may include Ethernet 64/66 encoded and Ethernet on SONET encapsulated within the SONET protocol. In one embodiment, all processing are designed for data rates of at least 10 Gb/s.

In one embodiment, the elements are all disposed within a single integrated circuit, i.e. the networking processor is a single IC multi-protocol networking processor supporting the plurality of datacom and telecom protocols spanning local, regional and wide area networks.

BRIEF DESCRIPTION OF DRAWINGS

The present invention will be described by way of exemplary embodiments, but not limitations, illustrated in the accompanying drawings in which like references denote similar elements, and in which.

| GLOSSARY | |
|---|---|
| 10 Gbase-LR | 64/66 coded 1310 nm LAN standard for 10 Gigabit Ethernet |
| 10 Gbase-LW | 64/66 coded SONET encapsulated 1310 nm WAN standard for 10 Gigabit Ethernet |
| DWDM | Dense Wavelength Division Multiplexing |
| Egress | Outgoing data path from the system to the network |
| FCS | Frame Check Sequence |
| HDLC | High-Level Data Link Control. A communication protocol used in Packet over SONET switching network. |

-continued

GLOSSARY

| | |
|---|---|
| Ingress | Incoming data path from the network to the system |
| IP | Internet Protocol |
| IPG | Inter-Packet Gap |
| LAN | Local Area Network |
| LVDS | Low voltage differential signal |
| MAC | Media Access Control layer, defined for Ethernet systems |
| OIF | Optical Internetworking Forum |
| PCS | Physical Coding Sub-Layer |
| POS | Packet over SONET |
| PPP | Point to Point Protocol |
| SFD | Starting Frame Delimiter |
| SONET | Synchronous Optical network, a PHY telecommunication protocol |
| SPI-4 | System Packet Interface Level 4 (also POS-PHY 4) |
| SSTL | Stub Series Terminated Logic |
| XGMII | 10 Gb Media Independent Interface |
| WAN | Wide Area Network |

DETAILED DESCRIPTION OF THE INVENTION

In the following description, various aspects of the present invention will be described. However, it will be apparent to those skilled in the art that the present invention may be practiced with only some or all aspects of the present invention. For purposes of explanation, specific numbers, materials and configurations are set forth in order to provide a thorough understanding of the present invention. However, it will also be apparent to one skilled in the art that the present invention may be practiced without the specific details. In other instances, well known features are omitted or simplified in order not to obscure the present invention. Further, the description repeatedly uses the phrase "in one embodiment", which ordinarily does not refer to the same embodiment, although it may.

Overview

Figure 1:
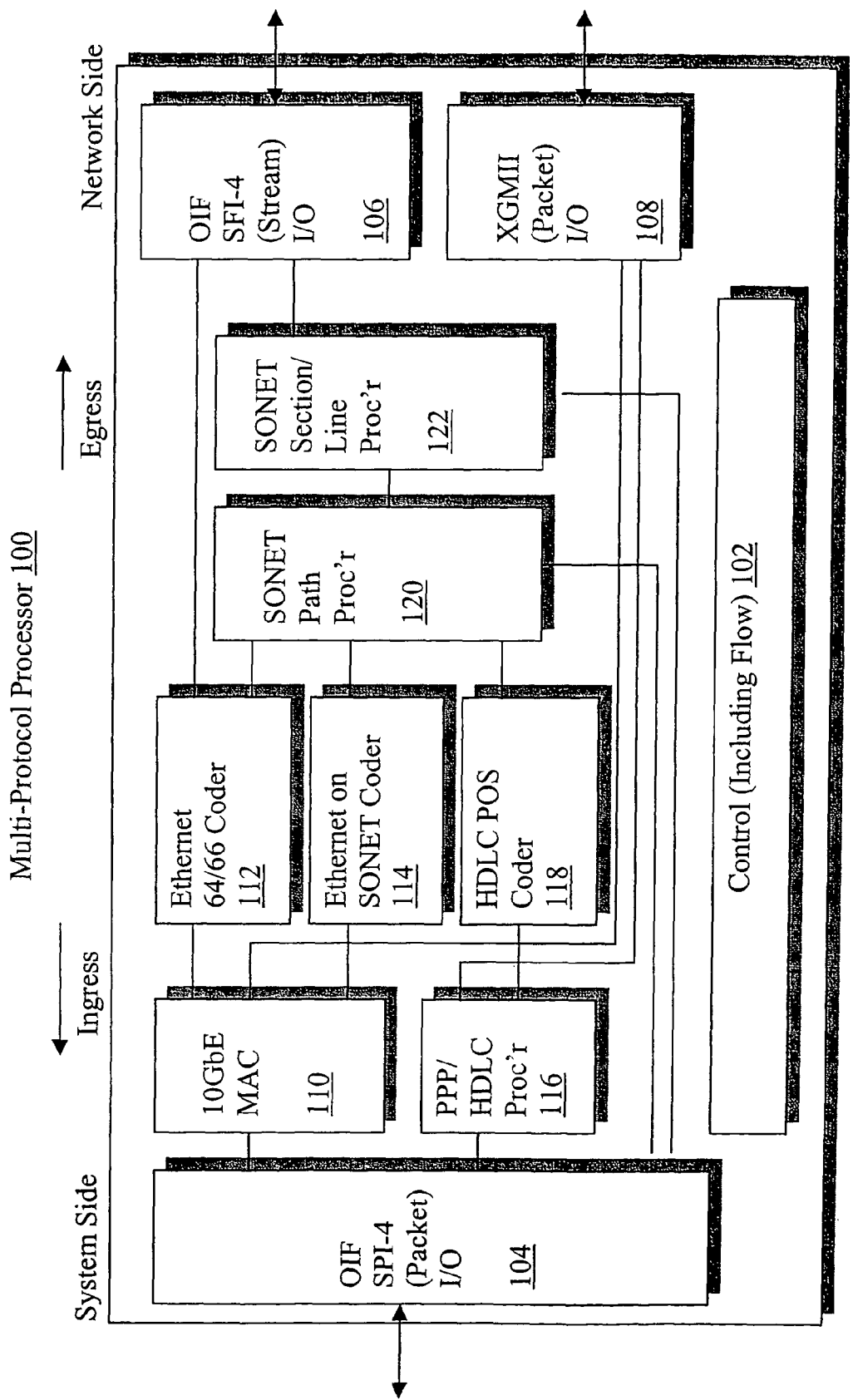
FIG. 1 illustrates an overview of the multi-protocol network processor of the present invention, in accordance with one embodiment.

Referring now to FIG. 1, wherein a block diagram illustrating an overview of the multi-protocol processor of the present invention, in accordance with one embodiment, is shown. As summarized earlier, the multi-protocol networking processor of the present invention is formed with selected ones of one or more system interfaces, one or more intermediate interfaces, one or more network interfaces, a plurality of data link sub-layer control/processing blocks, and a plurality of physical sub-layer coders/decoders and processing units. The elements are provisioned in a combinatorially selectable manner, enabling the single networking processor to be able to selectively facilitate data trafficking in accordance with a selected one of a plurality of protocols. As will be described in more detail below, the protocols include at least one each of a datacom and a telecom protocol, allowing the multi-protocol processor of the present invention to support data trafficking spanning local, regional as well as wide area networks.

For the illustrated embodiment, multi-protocol networking processor 100 includes system interface 104, network interface 106, intermediate interface 108, media access control block 110, Ethernet 64/64 coder 112, Ethernet on SONET coder 114, point-to-point protocol (PPP) and high level data link control (HDLC) processor 116, HDLC Packet over SONET coder 118, SONET path processor 120, SONET section and line processor 122, and control unit 102, coupled to each other as shown. Elements 104-122 are selectively employed in combination to service data transmission and receipt in accordance with a selected one of a number of frame based protocols, including frame based protocols encapsulated within a synchronous protocol, as well as streaming and packet variants of the synchronous protocol. As alluded to earlier, these protocols include at least one each a datacom and a telecom protocol.

More specifically, for the illustrated embodiment, the elements are employed in combination to service data transmission and receipt as follows:

| Protocols | Elements Employed |
|---|---|
| SONET Stream | System Interface, SONET Section/Line Processor, Network Interface |
| SONET Packet | System Interface, SONET path processor, SONET Section/Line Processor, Network Interface |
| Packet over SONET | System interface, HDLC processor, HDLC POS coder, SONET path processor, SONET Section/Line Processor, Network Interface |
| Ethernet on SONET | System Interface, 10 GbE MAC, Ethernet on SONET coder, SONET path processor, SONET Section/Line Processor, Network Interface |
| 10 GbE WAN | System Interface, 10 GbE MAC, Ethernet 64/66 coder, SONET path processor, SONET Section/Line Processor, Network Interface |
| 10 GbE LAN | System Interface, 10 GbE MAC, Ethernet 64/66 coder, Network Interface |
| MAC Frame | System Interface, 10 GbE MAC, Intermediate Interface |
| HDLC Frame | System Interface, HDLC Processor, Intermediate Interface |

As those skilled in the art would appreciate, the novel concurrent support of these protocols in a dynamically selectable fashion, in particular, the inclusion of 10 Gb Ethernet and Packet over SONET protocols, advantageously enable the processor of the present invention to span local, regional, and wide area networks.

For the illustrated embodiment, the "operating" protocol is specified to control unit 102, which in turn controls the above enumerated elements accordingly. In a preferred variant of the illustrated embodiment, control unit 102 includes a programmable interface (not shown) through which, the "operating" protocol may be specified. More specifically, control unit 102 includes a control register having a 3-bit "protocol" field. The 3-bit "protocol" field is accessible via 3 corresponding pins (not shown).

System interface 104 is provided to facilitate input of egress data and output of ingress data. In one embodiment, system interface 104 is a 16-bit parallel LVDS packet interface, compliant with 01F's SPI-4 interface defined for OIF-SPI4-02.0, which is a (phase 2) interface for the communication of packetized data between a physical layer and link layer entity. In one implementation, the 16-bit differential transmit and receive data busses operate at speed up to 832 Mb/s per bus line. By virtue of the ability of processor 100 to support the afore enumerated protocols, the transmit and receive data (i.e. the egress and ingress data) may be MAC, IP, PPP, HDLC or SONET framed/streaming data (including their in-band control words, where applicable).

10 GbE MAC block 110 is provided to perform data link sub-layer media access control processing on egress and ingress MAC and IP data. For egress data, 10 GbE MAC block 110 accepts correctly formatted frames (minus the preamble or start frame delimiter), and in response, adds the appropriate preamble/start frame delimiter, pads or truncates the frames as necessary to meet the minimum and maximum frame size requirements, and calculates and inserts the appropriate frame check sequences.

Ethernet 64/66 coder 112 and Ethernet on SONET Coder 114 are provided to perform physical sub-layer 64/66 and Ethernet on SONET coding and decoding for the egress and ingress MAC data respectively.

PPP/HDLC processor 116 is provided to perform data link sub-layer point-to-point protocol and high level data link control processing on IP, PPP, and HDLC data. PPP/HDLC processor 116 is employed to frame or de-frame IP and POS data, providing appropriate encapsulation or de-encapsulation, in accordance to PPP and HDLC. Similarly, HDLC POS coder 118 is provided to perform physical sub-layer Packet over SONET coding and decoding for the egress and ingress HDLC data respectively.

SONET path processor 120 is provided to perform path processing for "packetized" SONET data and coded frame-based data, whereas SONET section and line processor 122 is provided to perform section and line processing for "packetized" as well as "streaming" SONET data.

Network interface 106 is provided to facilitate output of egress data and input of ingress data. In one embodiment, correspondingly, network interface 106 is a 16-bit LVDS interface compliant with OIF's SFI-4 interface. In one embodiment, it operates at 622 MHz (645 for Ethernet 64/66 encoded data). Similar to system interface 104, by virtue of the ability of processor 100 to support the various protocols, the egress and ingress data may be physically coded MAC, IP, PPP, HDLC or SONET framed/streaming data (including their in-band control words, where applicable). The coded data may be a SONET data stream encapsulating the higher-layer protocols or a 64/66 coded Ethernet stream.

Intermediate interface 108 on the other hand is provided to facilitate output of MAC or HDLC egress data and input of MAC or HDLC ingress data. In one embodiment, intermediate interface 108 is a 32-bit SSTL-2 interface. In one embodiment, intermediate interface 108 operates at 312.5 MHz.

For a preferred implementation of the illustrated embodiment, all processing are designed for data rates of 10 Gb/s or higher. Further, elements 102-122 are disposed on a single integrated circuit (IC), i.e. multi-protocol networking processor 100 is a single IC processor. Accordingly, single IC multi-protocol networking processor 100 may advantageously serve multiple market segments, spanning local, regional and wide area networks at the same time. For examples, it may be used on network equipment for optical networking market, router to DWDM intraconnect, WAN uplinks and 10 GbE.

Before further describing the non-interface elements 104-122, it should be noted that the present invention may be practiced with more or less elements, provided that the attribute of combining datacom and telecom protocols and the characteristics of high speed data rates are maintained. Obviously, less elements result in less protocols being supported, while additional protocol supporting elements may result in additional protocols being supported. In addition to additional protocol supporting elements, the present invention may also be practiced with other complementary or auxiliary protocol supporting functional units. For example, processor 100 may also be provided with a multi-stage flexible SONET overhead interface or an advanced packet filtering unit. Multi-stage flexible SONET overhead interface is the subject matter of application Ser. No. 09/860,367, now issued as U.S. Pat. No. 6,580,731, entitled "Multi-Stage SONET Overhead Processing", filed contemporaneously with the parent patent of the current application, and having at least partial common inventorship with the present invention. application Ser. No. 09/860,367 is hereby fully incorporated by reference.

10 GbE MAC

Figure 2:
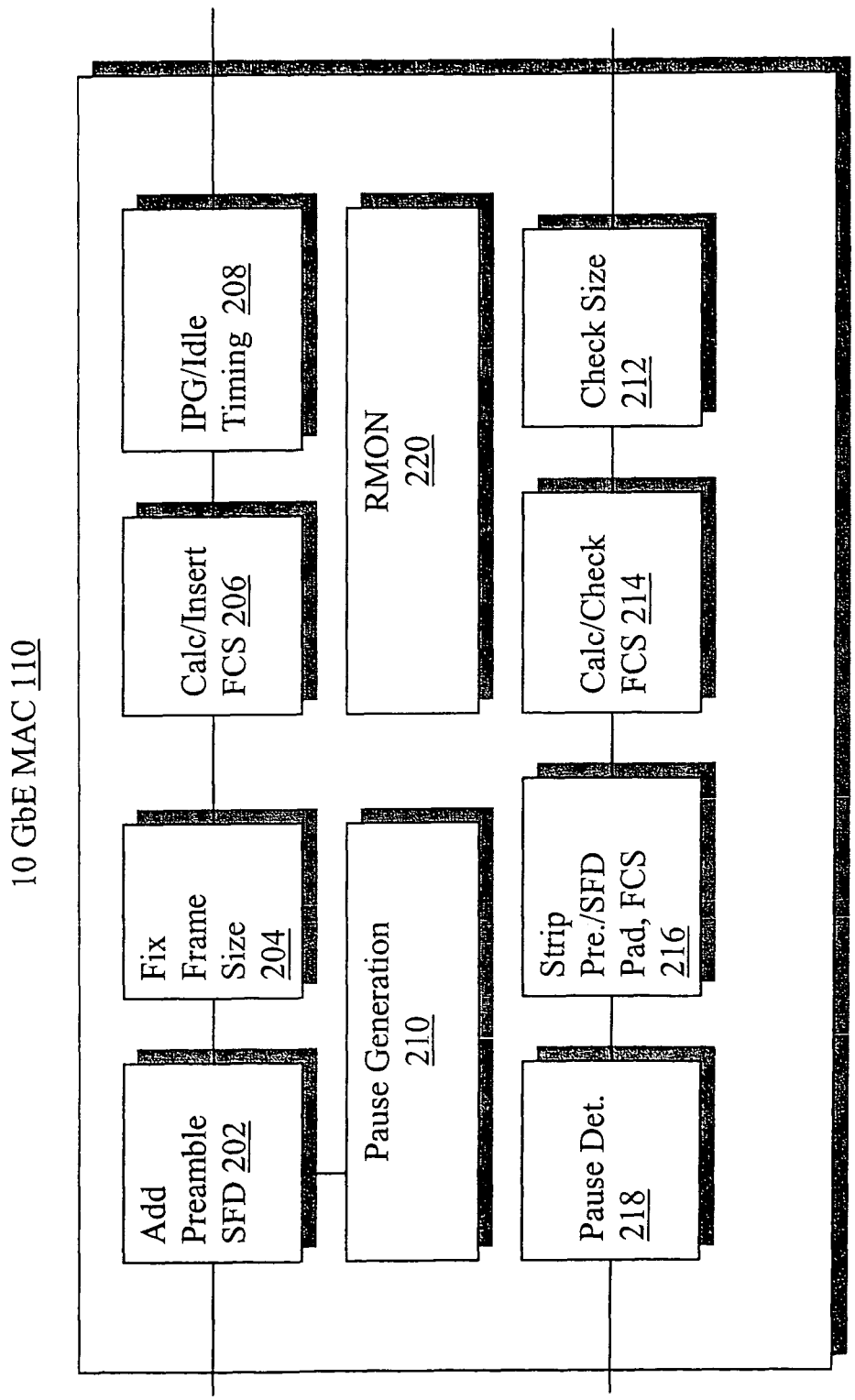
FIG. 2 illustrates the 10 GbE MAC of FIG. 1 in further details, in accordance with one embodiment.

Referring now to FIG. 2, wherein a block diagram illustrating 10 GbE MAC 110 in further detail, in accordance with one embodiment, is shown. As briefly described earlier, 10 GbE MAC 110 is provided to perform data link sub-layer media access control processing on egress and ingress data. For the illustrated embodiment, 10 GbE MAC 110 includes add preamble/SFD function 202, fix frame size function 204, FCS calculate and insert function 206, IPG/ldle Timing function 208, pause generation function 210, check size function 212, FCS calculation and check function 214, preamble/SFD stripping function 216, pause detection function 218, and remote monitor function 220, operatively coupled to each other as shown.

As alluded to earlier, add preamble/SFD function 202 is employed to add an appropriate preamble or starting frame delimiter for an egress frame. Fix frame size function 204 is employed to pad or truncate an egress frame to meet the minimum and maximum frame size requirements. Calculate and insert FCS function 206 is employed to calculate the FCS for an egress frame, and IPG/idle timing function 208 is employed to enforce compliance with the required IPG, as well as idle timing. Pause generation 210 is employed to generate pause frames.

For the ingress data, check size function 212 and FCS calculate and check function 214 are employed to validate the ingress data. Strip preamble/SFD function 216 is employed to strip off the preamble, SFD, padding etc. from the ingress data. Pause detection function 218 is employed to detect and respond to the presence of pause frames.

For the illustrated embodiment, remote monitor 220 includes a number of statistic counters to capture a number of operational statistics to facilitate remote monitoring of processor 100, in particular, the state of selected ones of the elements associated with the handling of Ethernet related egress and ingress data.

Each of the afore mentioned elements of MAC 110 may be implemented in any one of a number of techniques known in the art, which are within the ability of those ordinarily skilled in the networking processor art.

Ethernet 64/66 Coder

Figure 3:
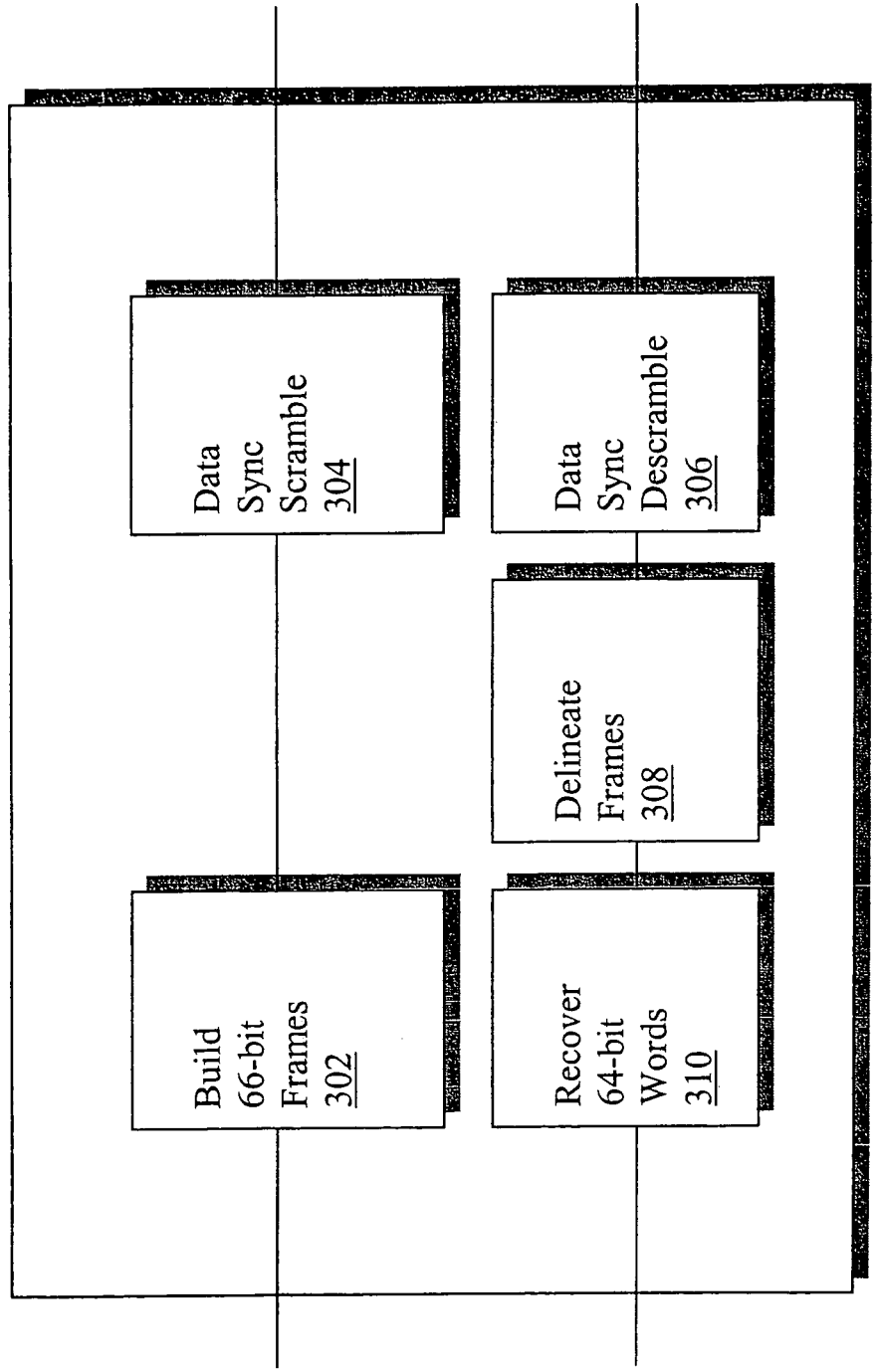
FIG. 3 illustrates the Ethernet 64/66 coder of FIG. 1 in further details, in accordance with one embodiment.

Referring now to FIG. 3, wherein a block diagram illustrating Ethernet 64/66 coder in further details, in accordance with one embodiment is shown. As described earlier, Ethernet 64/66 coder 112 is employed to perform physical sub-layer coding of framed egress data and recovery of framed ingress data from their coded counterparts. For the illustrated embodiment, Ethernet 64/66 coder 112 includes build 66-bit frame function 302, data sync scramble function 304, data sync descramble function 306, delineate frame function 308 and data recovery function 310, operatively coupled to each other as shown.

Build 66-bit frame function 302 is employed to build 66-bit egress frames. For the illustrated embodiment, egress words containing only packet data are used "as-is" as 64-bit words. Egress words containing control (idle) or control and data have their first byte replaced with a "type" field. A two-bit delineation token is added to each 64-bit sequence. Data sync scramble 304 is employed to scramble the stream of 66-bit egress "frames". The result may be serialized, or encapsulated in the synchronous protocol (SONET).

Data sync descramble 306 is employed to descramble a scrambled ingress frame. Delineate frame function 308 is employed to delineate the descrambled ingress frames. Recovery function 310 in turn is employed to recover the 64-bit ingress data from the delineated frames.

Similarly, each of the afore mentioned elements of Ethernet 64/66 Coder 112 may be implemented in any one of a number of techniques known in the art, which are within the ability of those ordinarily skilled in the networking processor art.

Ethernet on SONET Coder

Figure 4:
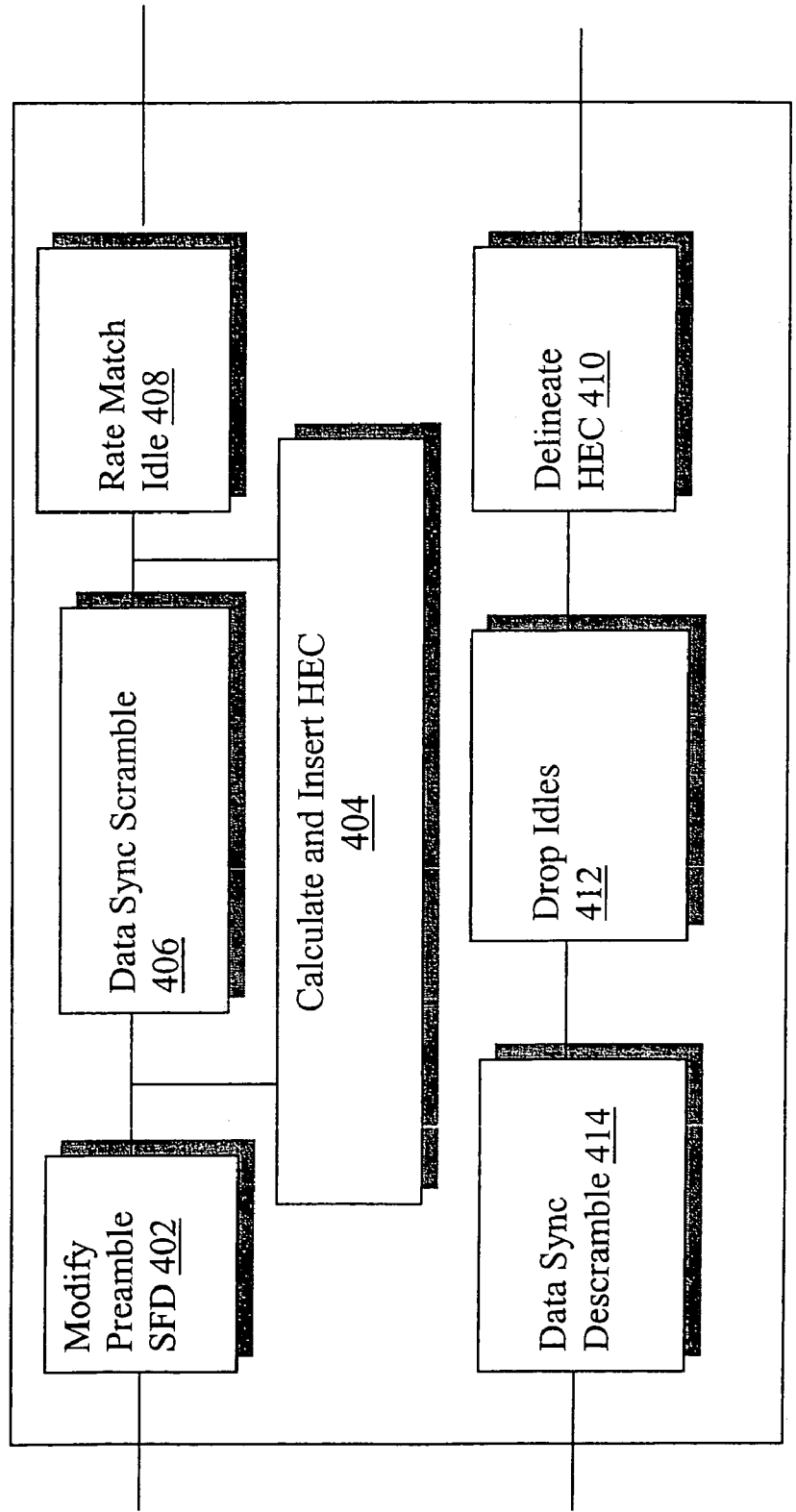
FIG. 4 illustrates the Ethernet on SONET coder of FIG. 1 in further details, in accordance with one embodiment.

Referring now to FIG. 4, wherein a block diagram illustrating Ethernet on SONET coder 114 in further detail, is shown. As described earlier, Ethernet on SONET coder 114 is employed to encode and decode framed egress and ingress data respectively. For the illustrated embodiment, Ethernet on SONET coder 114 includes modify preamble/SFD function 402, data sync scramble function 406, rate match idle function 408, calculate and insert HEC function 404, delineate HEC function 410, drop idle function 412, and data sync descramble function 414.

Modify preamble/SFD function 402 is employed to overwrite the preamble/SFD of egress packets with the PHY header containing the packet length and reserved data (8 bytes). Calculate/insert HEC function 404 is employed to calculate and insert a 2-byte header error checksum (HEC) between the PHY header and start of the main MAC frame. Data sync scramble function 406 is employed to scramble the main MAC frame. Rate match function 408 is employed to insert PHY idle cells (PHY header only) over the IPG, and whenever rate match is needed.

For the ingress data, delineate HEC function 410 is employed to delineate the HEC of the ingress data. Drop idles function 412 is employed to drop any idle cells added to the ingress data. Data sync descramble 414 is employed to descramble the scrambled main MAC frame.

As with the earlier units, each of the afore mentioned elements of Ethernet on SONET Coder 114 may be implemented in any one of a number of techniques known in the art, which are within the ability of those ordinarily skilled in the networking processor art.

PPP/HDLC Processor

Figure 5:
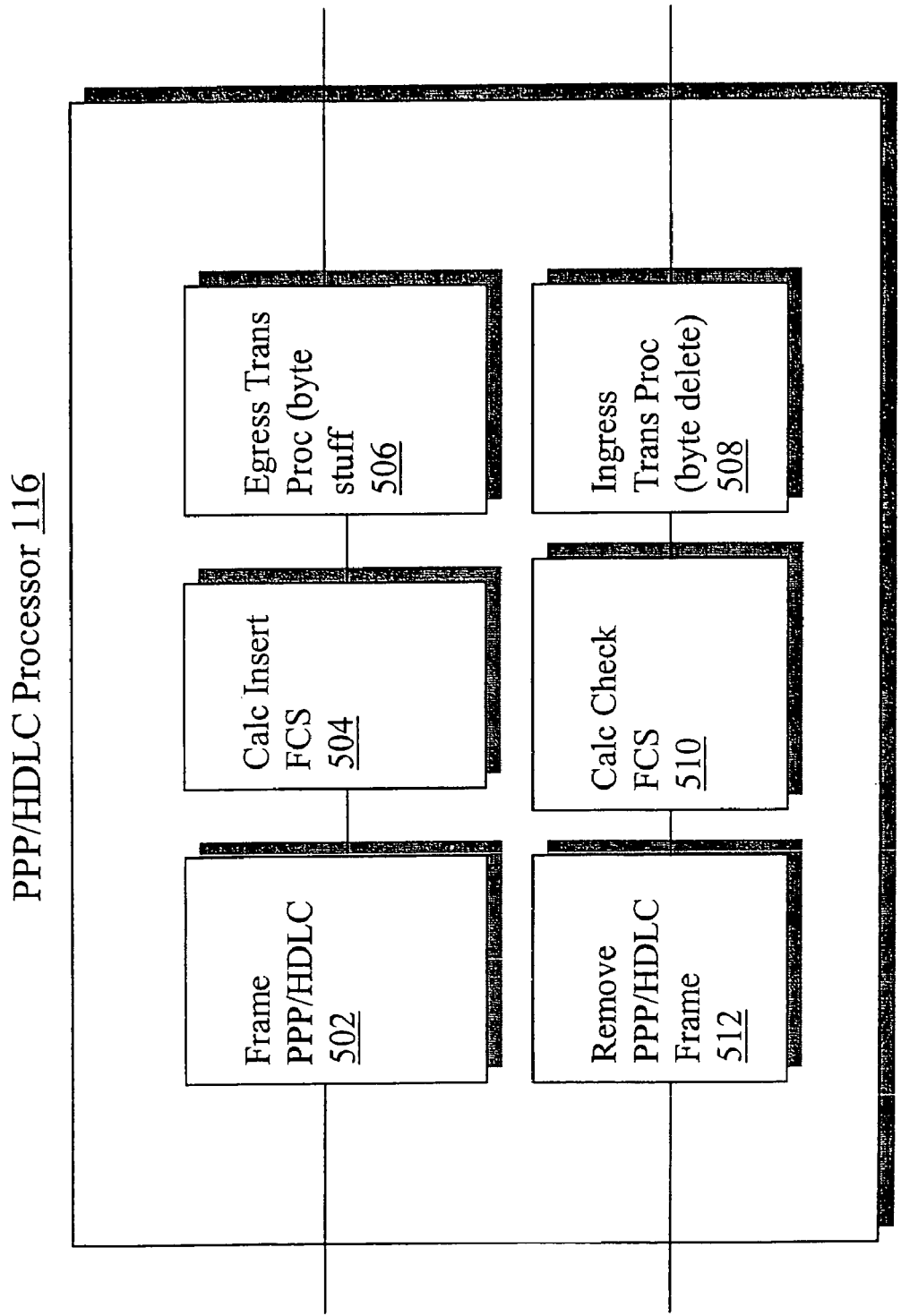
FIG. 5 illustrates the PPP/HDLC Processor of FIG. 1 in further details, in accordance with one embodiment.

Referring now to FIG. 5, wherein a block diagram illustrating PPP/HDLC processor 116 in further detail in accordance with one embodiment, is shown. As briefly described earlier, PPP/HDLC processor 116 is employed to perform data link sub-layer PPP and HDLC processing on framed egress and ingress data. For the illustrated embodiment, PPP/HDLC processor 116 includes frame PPP/HDLC function 502, calculate and insert FCS function 504, egress transparency processing function 506, ingress transparency processing function 508, calculate and check FCS function 510 and remove PPP/HDLC frame function 512.

PPP/HDLC frame function 502 is employed to frame or encapsulate the egress data as specified by RFC 1661 and RFC 1662. A flag is inserted before HDLC frame (and optionally follows). Optionally, programmable address/control and protocol fields are updated accordingly. Calculate and insert FCS function 504 is employed to calculate and insert FCS into a HDLC frame. Egress transparency processing function 506 is employed insert the appropriate escape flags and escape symbols into the HDLC frames.

For ingress data, ingress transparency processing function 508 is employed to perform the reverse, i.e. removing the inserted escape flags and escape symbols from the HDLC frames. Calculate and check FCS function 510 is employed to calculate and validate the FCS of the HDLC frames. Remove PPP/HDLC frame function 512 is employ to de-encapsulate the PPP/HDLC frames.

As with the earlier units, each of the afore mentioned elements of PPP/HDLC Processor 116 may be implemented in any one of a number of techniques known in the art, which are within the ability of those ordinarily skilled in the networking processor art. Additional features, such as packet size and idle enforcement and statistics monitoring, as in the MAC processor, may also be implemented in the PPP/HDLC processor, or shared between the two processors.

HDLC Packet Over SONET Coder

Figure 6:
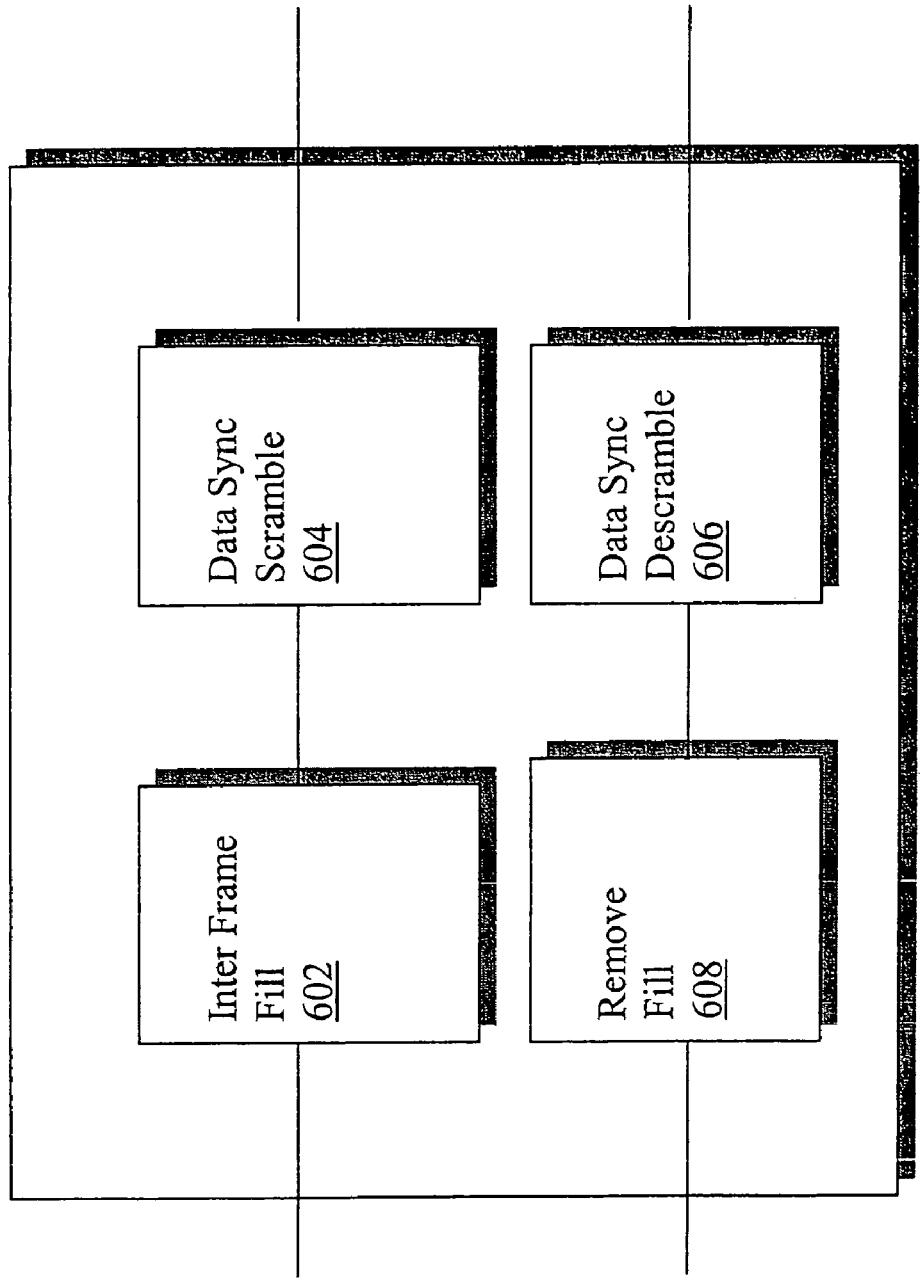
FIG. 6 illustrates the POS Coder of FIG. 1 in further details, in accordance with one embodiment.

Referring now to FIG. 6, wherein a block diagram illustrating HDLC Packet over SONET coder 118 in further details, in accordance with one embodiment, is shown. As briefly described earlier, HDLC Packet over SONET coder 118 is employed to encode HDLC egress data for transmission in accordance with the SONET protocol (i.e. encapsulated within SONET data), and decode the "embedded" HDLC ingress data from ingress SONET data. As illustrated, for the embodiment, HDLC Packet over SONET coder 118 includes inter-frame fill function 602, data sync scramble function 604, data sync descramble function 606, and remove fill function 608.

Inter-frame fill function 602 is employed to fill intra-frame space of the egress data with flag symbols, and data sync scramble function 604 is employed to scramble the egress frames per RFC 2615.

For the ingress data, data sync descramble function 606 is employed to descramble the scrambled ingress frames. Remove fill function 608 is employed to tag all but leading inserted flag symbols for removal.

As before, these elements may be implemented in any one of a number of techniques known in the art, which are within the abilities of those ordinarily skilled in the networking processor art.

SONET Path Processor

Figure 7:
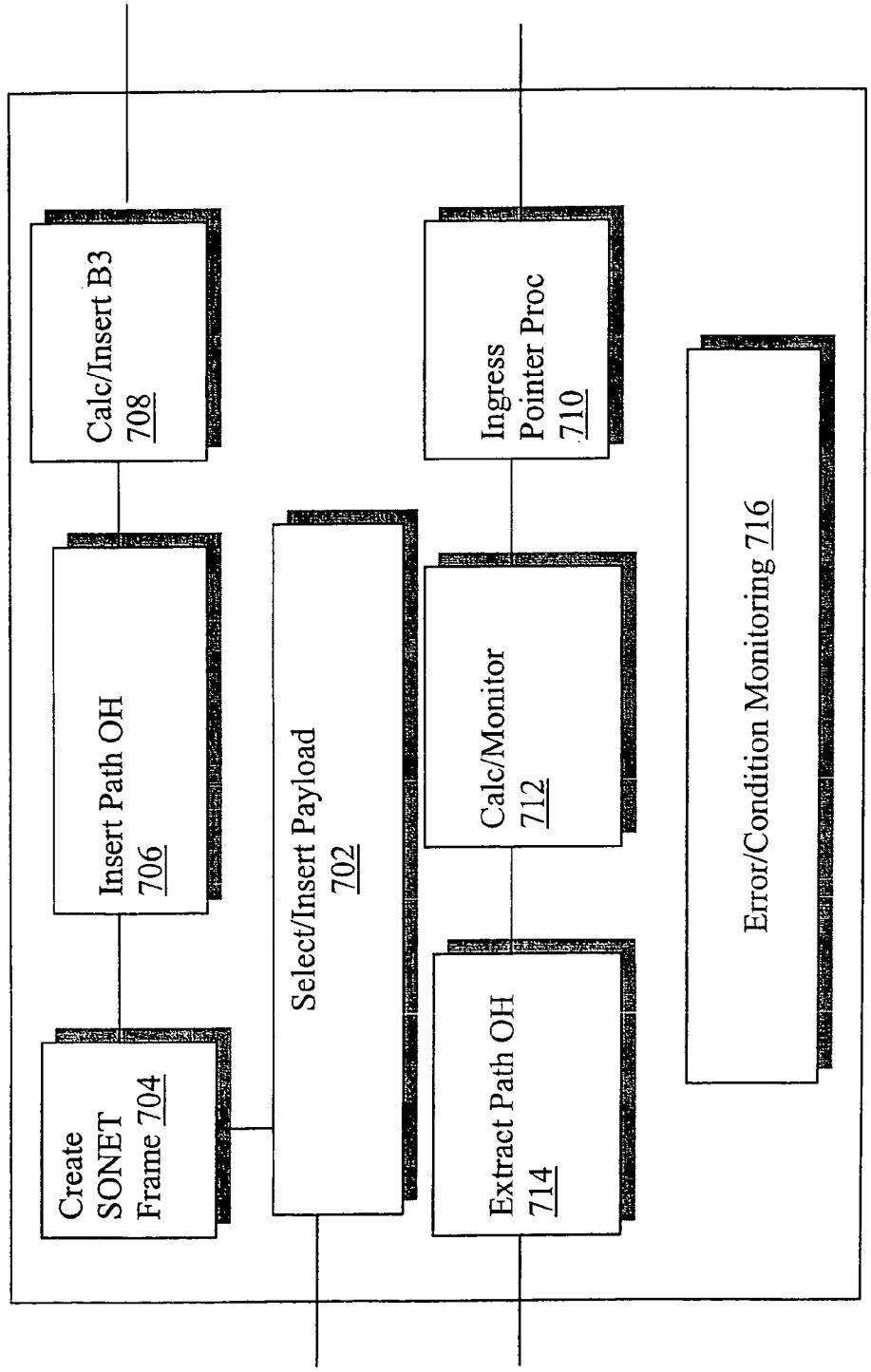
FIG. 7 illustrates the SONET Path Processor of FIG. 1 in further details, in accordance with one embodiment.

Referring now to FIG. 7, wherein a block diagram illustrating the SONET path processor 120 in accordance with one embodiment, is shown. As briefly described earlier, SONET path processor 120 is employed to perform physical sub-layer path processing for "packetized" egress and ingress SONET data. As illustrated, for the embodiment, SONET path processor 120 includes select/insert payload function 702, create SONET frame function 704, insert path overhead function 706, calculate/insert B3 function 708, ingress data pointer processing function 710, calculate and monitor B3 function 712, and extract path overhead function 714. For the embodiment, SONET path processor 120 further includes error condition monitoring function 716.

Select/insert payload function 702 is employed to select and insert a payload into a SONET stream. For the illustrated embodiment, depending on the protocol being configured to support at the moment, the payload may be selected from a stream buffer (raw SONET payload), from the output of one of the coders (i.e. Ethernet 64/66 coder 112, Ethernet on SONET coder 114 and HDLC Packet over SONET coder 118). Create SONET frame function 704 is employed to create the SONET frames. Insert path overhead function 706 is employed to insert programmable information into the overhead (if applicable). Calculate and insert B3 function 708 is employed to perform and insert the B3 calculations as specified by SONET.

For ingress data, ingress pointer processing function 710 is employed to process pointers of the ingress data in accordance with GR.253. Similarly, calculate and monitor B3 function 712 is employed to calculate and check the B3 values. Extract path overhead function 714 is employed to recover the path information for the ingress data. Error condition monitoring function 716 is employed to perform a number of error detection and fail soft recovery functions.

As before, these elements may be implemented in any one of a number of techniques known in the art, which are within the abilities of those ordinarily skilled in the networking processor art.

SONET Section and Line Processor

Figure 8:
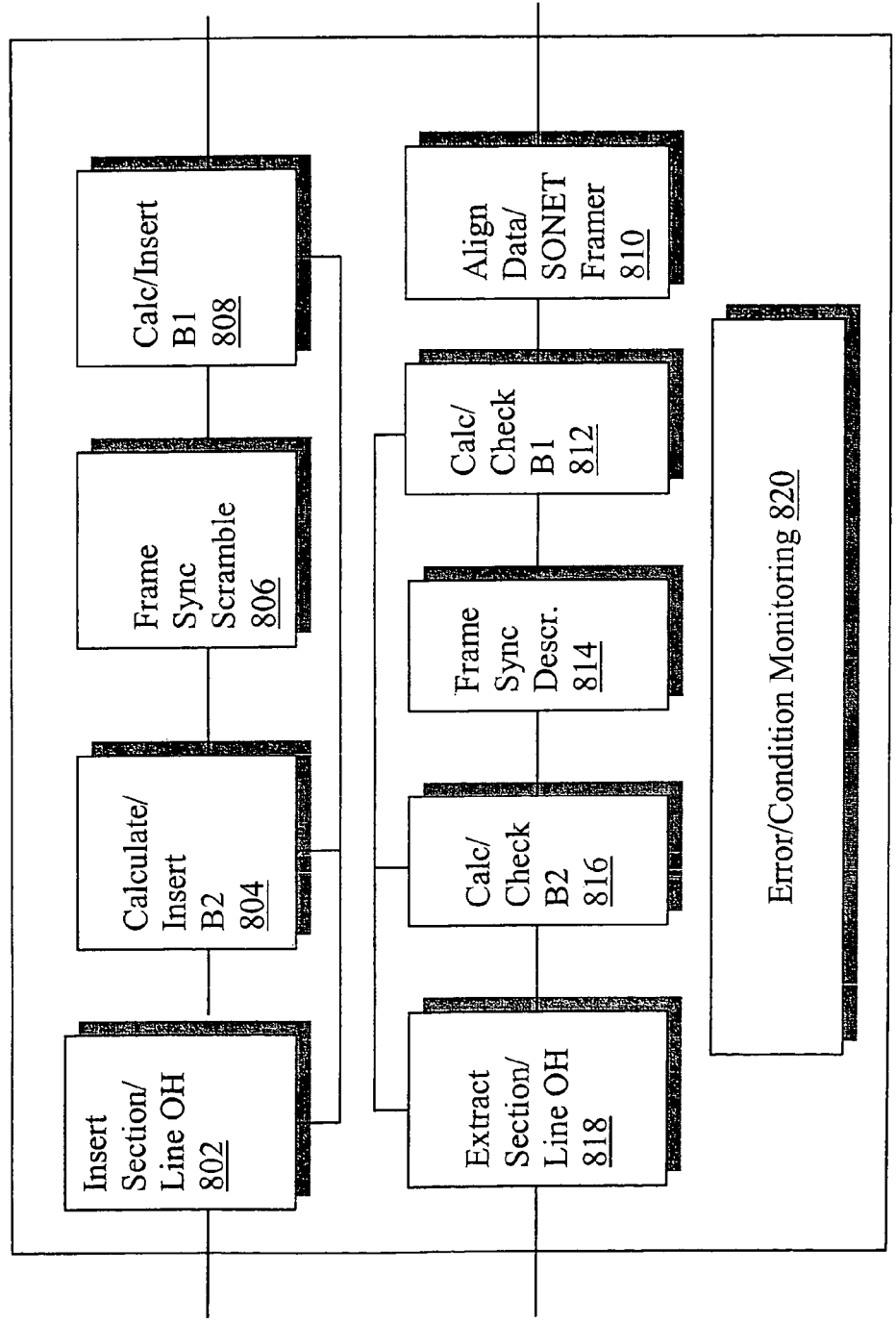
FIG. 8 illustrates the SONET Section/Line Processor of FIG. 1 in further details, in accordance with one embodiment.

Referring now to FIG. 8, wherein a block diagram illustrating the SONET section and line processor 122 in accordance with one embodiment, is shown. As briefly described earlier, SONET section and line processor 122 is employed to perform physical sub-layer section and line processing for "packetized" as well as "streaming" egress and ingress SONET data. As illustrated, for the embodiment, SONET section and line processor 122 includes insert section/line overhead function 802, calculate/insert B2 function 804, frame sync scramble function 806, calculate/insert B1 function 808, align data/SONET framer function 810, calculate/check B1 function 812, frame sync descramble function 814, calculate/check B2 function 816, and extract section/line overhead function 818. For the embodiment, SONET section and line processor 122 further includes error condition monitoring function 820.

Insert section/line overhead function 802 is employed to insert the programmable information into section and line overhead (if applicable). Calculate/insert B2 and B1 functions 804 and 808 are employed to calculate and insert the B2 and B1 values before and after the egress data are scrambled respectively. Frame sync scramble function 806 is employed to scramble a SONET frame after insertion of the B1 and B2 values, but before calculation of the B1 value.

For ingress data, align data function 810 is employed to the ingress data to SONET frame word. SONET frame detection and monitoring is also performed as part of this function. Similarly, calculate and check B1 and B2 functions 812 and 816 are employed to calculate and check the B1 and B2 values before and after the ingress data are descrambled. Frame sync descramble function 814 is employed to descramble a scrambled SONET frame after calculation of the B1 values, but before calculation of the B2 values. Extract section and line OH function 818 is employed to recover the section and line information for the ingress data. Error condition monitoring function 820 is employed to perform a number of error detection and fail soft recovery functions.

As before, these elements may be implemented in any one of a number of techniques known in the art, which are within the abilities of those ordinarily skilled in the networking processor art.

Conclusion and Epilogue

Thus, it can be seen from the above descriptions, a novel highly flexible multi-protocol networking processor singularly capable of selectively facilitating transmission and receipt of egress and ingress data for a wide range of protocols and capable of spanning local, regional and wide area networks has been described. While the present invention has been described in terms of the above described embodiments, those skilled in the art will recognize that the invention is not limited to the embodiments described. The present invention can be practiced with modification and alteration within the spirit and scope of the appended claims. Thus, the description is to be regarded as illustrative instead of restrictive on the present invention.

What is claimed is:

1. A multi-protocol processor, comprising:
a system I/O interface capable of selecting one or more of physical input of egress data or physical output of ingress data, or combinations thereof, wherein the selecting comprises selective facilitation of physical input/output of framed egress/ingress data being transmitted/received based at least in part upon a selected one of a plurality of frame-based protocols, and based at least in part upon a data flow type specification, wherein the data flow type specification to specify a data flow based at least in part upon said selected one of said plurality of frame-based protocols; and
a first control circuit coupled to the system I/O interface, wherein the first control circuit is capable of performing data link sub-layer frame processing on framed egress data inputted through said system I/O interface, or framed ingress data to be outputted through said system I/O interface, or both, based at least in part upon the data flow type specification specifying a selected one of a first subset of said plurality of frame-based protocols.

2. The multi-protocol processor according to claim 1, further comprising:
a first coder coupled to the first control circuit, wherein the first coder is capable of performing physical sub-layer encoding and decoding of said framed egress/ingress data, based at least in part upon the data flow type specification specifying said selected one of said first subset of said plurality of frame-based protocols.

3. The multi-protocol processor according to claim 2, further comprising:
a second control circuit coupled to the first coder, wherein the second control circuit is capable of performing physical sub-layer path processing on said framed egress/ingress data, based at least in part upon the data flow type specification specifying a selected one of a second subset of said plurality of frame-based protocols.

4. The multi-protocol processor according to claim 3, further comprising:
a second coder coupled to the second control circuit, wherein the second coder is capable of performing physical sub-layer encoding and decoding of said framed egress/ingress data, based at least in part upon the data flow type specification specifying said selected one of said second subset of said plurality of frame-based protocols.

5. The multi-protocol processor according to claim 4, further comprising:
a third control circuit coupled to the second control circuit, wherein the third control circuit is capable of performing physical sub-layer section and line processing on the framed egress/ingress data, based at least in part upon the data flow type specification specifying a selected one of said plurality of frame-based protocols.

6. The multi-protocol processor of claim 3, further comprising:

an intermediate I/O interface coupled to the first or second control circuits, wherein the intermediate I/O interface is capable of facilitating a selected one of physical output of egress data, or physical input of ingress data, or both, including selective facilitation of physical input/output of framed egress/ingress data being transmitted/received based at least in part upon a selected one of a third subset of said plurality of frame-based protocols.

7. The multi-protocol processor according to claim 1, wherein the first control circuit comprises an Ethernet media access control circuit.

8. The multi-protocol processor according to claim 2, wherein the first coder comprises an Ethernet 64/66 coder.

9. The multi-protocol processor according to claim 3, wherein the second control circuit comprises a SONET path processing circuit.

10. The multi-protocol processor according to claim 5, wherein the third control circuit comprises a SONET section and line processing circuit.

11. The multi-protocol processor according to claim 1, wherein the selected one of said plurality of frame-based protocols comprise an Ethernet 64/66 coding based protocol.

12. The multi-protocol processor according to claim 1, wherein the system I/O interface is capable of selectively facilitating physical input/output of streaming egress/ingress data being transmitted/received based at least in part upon a streaming version of a synchronous protocol, and based at least in part upon the data flow type specification specifying a data flow based at least in part upon said streaming version of said synchronous protocol.

13. The multi-protocol processor according to claim 5, wherein the third control circuit is capable of performing said physical sub-layer section and line processing on streaming egress/ingress data, based at least in part upon the data flow type specification specifying a streaming version of a synchronous protocol.

14. The multi-protocol processor according to claim 1, wherein the system I/O interface is capable of selectively facilitating physical input/output of packetized egress/ingress data being transmitted/received based at least in part upon a packetized version of a synchronous protocol, and based at least in part upon the data flow type specification specifying a data flow based at least in part upon said packetized version of said synchronous protocol.

15. The multi-protocol processor according to claim 3, wherein the second control circuit is capable of performing said physical sub-layer path processing on packetized egress/ingress data, based at least in part upon the data flow type specification specifying a packetized version of a synchronous protocol.

16. The multi-protocol processor according to claim 1, wherein the system I/O interface comprises an I/O interface in compliance with OIF's SPI-4 phase 2 I/O interface requirements.

17. The multi-protocol processor of claim 1, further including a network I/O interface comprising an I/O interface in compliance with OIF's SFI-4 I/O interface requirements.

18. The multi-protocol processor according to claim 5, wherein said multi-protocol processor is disposed on a single integrated circuit.

19. A multi-protocol processor, comprising:
means for selecting one or more of physical input of egress data or physical output of ingress data, or combinations thereof, comprising:
first means for selectively facilitating physical input/output of framed egress/ingress data being transmitted/received based at least in part upon a selected one of a first or a second frame-based protocol, or combinations thereof, and based at least in part upon a data flow type specification, capable of specifying a data flow based at least in part upon said selected one of said first or second frame-based protocols, or combinations thereof;
a first control block operatively coupled to the means for selecting, and configured to perform data link sub-layer frame processing on framed egress data inputted through said means for selecting, or on framed ingress data to be outputted through said means for selecting, or both, when the data flow type specification specifies said selected one of said first or second frame-based protocols;
a first coder coupled to the first control block, and configured to perform physical sub-layer encoding/decoding of said framed egress/ingress data, or combinations thereof, based at least in part upon the data flow type specification specifying said selected one of said first or second frame-based protocols;
a second control block coupled to the first coder and configured to perform physical sub-layer path processing on said framed egress/ingress data, based at least in part upon the data flow type specification specifying said second frame-based protocol as the selected one of said first or second frame-based protocols, or combinations thereof; and
second means for selectively facilitating physical output/input of said framed egress/ingress data based at least in part upon the data flow type specification specifying said selected one of said first or second frame-based protocols, or combinations thereof, wherein the second means for selectively facilitating is operatively coupled to the first coder and the second control block.

20. The multi-protocol processor according to claim 19, further comprising:
a third control block coupled to the second control block, and configured to perform physical sub-layer section or line processing on the framed egress/ingress data, or combinations thereof, based at least in part upon the data flow type specification specifying said second frame-based protocol as the selected one of said first or second frame-based protocols, or combinations thereof.

21. A method, comprising:
selecting by a system input/output (I/O) interface at least one of physical input of egress data or physical output of ingress data or combinations thereof, comprising selective facilitation of physical input/output of framed egress/ingress data being transmitted/received based at least in part upon a selected one of a plurality of frame-based protocols;
performing by a control circuit coupled to the system I/O interface, data link sub-layer frame processing on framed egress data input through the system I/O interface or framed ingress data to be output through the system I/O interface, and performing by the control circuit at least one of physical sub-layer path processing or physical sub-layer section and line processing on the framed egress/ingress data, based at least in part upon a data flow type specification of the selected one of a plurality of frame-based protocols;
performing by a coder, physical sub-layer encoding/decoding of said framed egress/ingress data, based at least in part upon the data flow type specification; and selectively facilitating by one or more network interfaces, physical output/input of said framed egress/ingress data based at least in part upon the data flow type specification.

22. The method of claim 21, wherein performing physical sub-layer path processing on said framed egress/ingress data by the control circuit comprises recovering path information from the framed ingress data.

23. The method of claim 21, wherein the control circuit comprises one or more control blocks.

24. The method of claim 23, wherein the one or more control blocks comprise at least one of a point-to-point protocol (PPP) and high level data link control (HDLC) processor, a SONET path processing unit, or a SONET section and line processing unit.

25. The method of claim 21, wherein performing by the control circuit at least one of physical sub-layer path processing or physical sub-layer section and line processing on the framed egress/ingress data comprises descrambling the framed ingress data.

26. An apparatus, comprising:
a network router that includes:
a processor including:
one or more system input/output (I/O) interfaces;
a plurality of data link sub-layer processing blocks coupled to the one or more system I/O interfaces; and
one or more network interfaces coupled to the one or more system I/O interfaces and the plurality of data link sub-layer processing blocks, wherein the one or more system I/O interfaces, one or more of the plurality of data link sub-layer processing blocks and the one or more network interfaces are combinatorially selectable to enable the multi-protocol processor to selectively facilitate data trafficking in accordance with a selected one of a plurality of protocols.

27. A system, comprising:
a SONET trunk coupled to a network;
an Internet point of presence (POP) configured to provide an internet service to subscribers over a plurality of digital subscriber lines, said Internet POP comprising SONET equipment including:
an electrical/optical converter coupled to said SONET trunk; and
a processor including:
one or more system input/output (I/O) interfaces:
a plurality of data link sub-layer processing blocks coupled to the one or more system I/O interfaces; and
one or more network interfaces coupled to the one or more system I/O interfaces and the plurality of data link sub-layer processing blocks, wherein the one or more system I/O interfaces, one or more of the plurality of data link sub-layer processing blocks and the one or more network interfaces are combinatorially selectable to enable the multi-protocol processor to selectively facilitate data trafficking in accordance with a selected one of a plurality of protocols.

28. The system of claim 27 wherein the processor further comprises a coder configured to perform physical sub-layer encoding and decoding of framed egress/ingress data.

29. The system of claim 27, wherein the one or more system I/O interfaces is configured to selectively facilitate physical input/output of framed egress/ingress data being transmitted/received based at least in part upon a selected one of a plurality of frame-based protocols, and based at least in part upon a data flow type specification, the data flow type specification specifying a data flow based at least in part upon said selected one of said plurality of frame-based protocols.

30. The system of claim 27, wherein the one or more of the plurality of data link sub-layer control/processing blocks comprises a control circuit configured to process framed egress data inputted through said one or more system I/O interfaces, or framed ingress data to be outputted through said one or more system I/O interfaces.

31. A multi-protocol processor comprising:
a system I/O interface to facilitate a selected one or more of physical input of egress data and physical output of ingress data, including selective facilitation of physical input/output of framed egress/ingress data being transmitted/received in accordance with a selected one of a first and a second frame-based protocols, responsive to a data flow type specification specifying a data flow in accordance with said selected one of said first and second frame-based protocols;
a first control block coupled to the system I/O interface to perform data link sub-layer frame processing of a selected one of a first and a second type on framed egress data input through said system I/O interface, framed ingress data to be output through said system I/O interface, or both, when the data flow type specification specifies a corresponding selected one of said first and second frame-based protocols;
a coder coupled to the first control block to perform physical sub-layer encoding and decoding of said framed egress/ingress data, when the data flow type specification specifies said selected one of said first and second frame-based protocols;
a second control block coupled to the coder to perform physical sub-layer path processing or physical sub-layer section and line processing on the framed egress/ingress data, when the data flow specification specifies said selected one of said first and second frame-based protocols; and
a network interface coupled to the coder and the second control block to selectively facilitate physical output/input of said framed egress/ingress data.

32. The multi-protocol processor of claim 31, wherein the coder comprises an Ethernet on SONET coder.

33. The multi-protocol processor of claim 31, wherein the second control block comprises an path overhead insert function configured to insert information into a path overhead of the framed egress data.

34. The multi-protocol processor of claim 31, wherein the second control block comprises a section/line overhead insert function configured to insert information into a section and line overhead of the framed egress data.

35. The multi-protocol processor of claim 31, wherein the second control block comprises an error condition monitoring function configured to perform an error detection function or fail soft recovery function.

36. A multi-protocol processor, comprising:
a system I/O interface to facilitate a selected one or more of physical input of egress data and physical output of ingress data, including selective facilitation of physical input/output of framed egress/ingress data being transmitted/received in accordance with a selected one of a first and a second frame-based protocols, responsive to a data flow type specification specifying a data flow in accordance with said selected one of said first and second frame-based protocols;

a control circuit coupled to the system I/O interface to perform data link sub-layer frame processing and physical sub-layer section and line processing on framed egress data input through said system I/O interface, framed ingress data to be output through said system I/O interface, or both, when the data flow type specification specifies a corresponding selected one of said first and second frame-based protocols;

a coder coupled to the control circuit to perform physical sub-layer encoding/decoding of said framed egress/ingress data, when the data flow type specification specifies said selected one of said first and second frame-based protocols;

and a network interface coupled to the coder and the control circuit to selectively facilitate physical input/output of said framed egress/ingress data when the data flow type specification specifies said selected one of said first and second frame-based protocols.

37. The multi-protocol processor of claim 36, wherein the control circuit includes an extract section and line overhead function configured to recover section and line information for the framed ingress data.

38. The multi-protocol processor of claim 36, wherein the control circuit is configured to scramble framed egress data after insertion of B1 and B2 values into the framed egress data.

39. The multi-protocol processor of claim 36, wherein the control circuit comprises one or more control blocks.

40. The multi-protocol processor of claim 39, wherein the one or more control blocks comprise at least one of a point-to-point protocol (PPP) and high level data link control (HDLC) processor, a SONET path processing unit, and a SONET section and line processing unit, wherein the coder is a HDLC Packet over SONET (POS) coder, and wherein the first and the second frame-based protocols include HDLC-based protocols including a POS protocol.

* * * * *

UNITED STATES PATENT AND TRADEMARK OFFICE
CERTIFICATE OF CORRECTION

| | |
|---|---|
| PATENT NO. | : 8,306,037 B2 |
| APPLICATION NO. | : 11/343387 |
| DATED | : November 6, 2012 |
| INVENTOR(S) | : Denton et al. |

It is certified that error appears in the above-identified patent and that said Letters Patent is hereby corrected as shown below:

Title Page, in Item (57), under "ABSTRACT" in Column 2, Line 9, delete "one each a datacom" and insert -- one each of a datacom --, therefor.

Title Page, in Item (57), under "ABSTRACT" in Column 2, Line 14, delete "plurality frame based" and insert -- plurality of frame-based --, therefor.

Title Page, in Item (57), under "ABSTRACT" in Column 2, Lines 15-16, delete "frame based" and insert -- frame-based --, therefor at each occurrence throughout the Patent.

Title Page 2, in Item (56), under "OTHER PUBLICATIONS", in Column 2, Line 4, delete "An Architecture for Packet-Striping Protocols," and insert -- "An Architecture for Packet-Striping Protocols", --, therefor.

In the Specifications:

In Column 4, Lines 5-6, delete "one each a datacom" and insert -- one each of a datacom --, therefor.

In Column 6, Line 1, delete "invention. application" and insert -- invention. Application --, therefor.

In the Claims:

In Column 14, Line 47, in Claim 33, delete "an path" and insert -- a path --, therefor.

Signed and Sealed this
Thirtieth Day of April, 2013

Teresa Stanek Rea
*Acting Director of the United States Patent and Trademark Office*